United States Patent
Ageby et al.

(10) Patent No.: US 7,305,002 B1
(45) Date of Patent: Dec. 4, 2007

(54) METHODS FOR CONTROLLING RESOURCES IN A COMMUNICATION NETWORK

(75) Inventors: Johan Ageby, Stockholm (SE); Erik Brage, Stockholm (SE); Christer Bohm, Nacka (SE)

(73) Assignee: Net Insight AB, Stockholm (SE)

( * ) Notice: Subject to any disclaimer, the term of this patent is extended or adjusted under 35 U.S.C. 154(b) by 945 days.

(21) Appl. No.: 10/129,293

(22) PCT Filed: Oct. 27, 2000

(86) PCT No.: PCT/SE00/02108

§ 371 (c)(1),
(2), (4) Date: Dec. 18, 2002

(87) PCT Pub. No.: WO01/33776

PCT Pub. Date: Oct. 5, 2001

(30) Foreign Application Priority Data

Nov. 5, 1999 (SE) .................................... 9904026

(51) Int. Cl.
*H04B 7/212* (2006.01)
(52) U.S. Cl. ....................... 370/442; 370/235
(58) Field of Classification Search ............... 370/400, 370/236, 442, 458, 395.2, 410, 445, 444, 370/395.21, 460, 347, 263, 222
See application file for complete search history.

(56) References Cited

U.S. PATENT DOCUMENTS

| | | | | |
|---|---|---|---|---|
| 4,866,708 A | | 9/1989 | Ardon et al. ............... 370/381 |
| 5,349,580 A | * | 9/1994 | Hester et al. ............... 370/461 |
| 5,636,212 A | * | 6/1997 | Ikeda ......................... 370/233 |
| 5,831,973 A | * | 11/1998 | Yokotani et al. ............ 370/236 |
| 5,838,662 A | * | 11/1998 | Miyamoto .................. 370/230 |
| 6,934,284 B1 | * | 8/2005 | Danielson et al. .......... 370/384 |

FOREIGN PATENT DOCUMENTS

| | | |
|---|---|---|
| EP | 0 428 407 A2 | 11/1990 |
| EP | 0 510 290 A1 | 4/1991 |
| JP | 4316240 | 11/1992 |
| WO | WO 97/24846 | 7/1997 |
| WO | WO 97/36401 | * 10/1997 |
| WO | WO 97/36402 | 10/1997 |
| WO | WO 99/55036 | 10/1999 |

* cited by examiner

*Primary Examiner*—Edan Orgad
*Assistant Examiner*—Lawrence J Burrowes
(74) *Attorney, Agent, or Firm*—Finnegan, Henderson, Farabow, Garrett & Dunner L.L.P.

(57) ABSTRACT

The present invention refers to a method for controlling resources on a communication link that transports data in time slots, wherein access to the time slots is distributed among nodes connected to the link. A state of access to a set of one or more of the time slots may be determined by the step of sending an inquiry to one or more of the nodes and receiving one or more replies to the inquiry from the one or more nodes. The inquiry and replies may be related to whether or not any one of the one or more nodes considers itself as currently having access to any one or more of the set of time slots.

14 Claims, 4 Drawing Sheets

METHODS FOR CONTROLLING RESOURCES IN A COMMUNICATION NETWORK

TECHNICAL FIELD OF INVENTION

The present invention refers to methods for controlling resources on a communication link that transports data in time slots, wherein access to said time slots is distributed among nodes connected to said link. More particularly, the invention refers to allocation of time slots in Dynamic synchronous Transfer Mode (DTM) networks.

BACKGROUND

A DTM network is an example of a time-division multiplexed, circuit-switching communication network in which the distribution of access to the bandwidth resources of the network can be dynamically adjusted.

The topology of a DTM network is based upon unidirectional communication on time-division multiplexed bitstreams propagating on optical fibres, wherein each bitstream preferably is accessed by multiple nodes, e.g. in a bus or ring link structure. The bandwidth of each link is divided into 125 μs frames, which in turn are divided into 64-bit time slots. In a system of this kind, write access to time slot is typically distributed among the nodes connected to said bitstream. A node will thus typically have write access to a number of the slots, i.e. to a specific set of slot positions within each recurring frame, and may thereby use these slots for transmission. It may thus only use a slot for transmission if it has write access to this specific slot position.

The distribution of write access to slots among the nodes may typically be changed when so desired or required. For example, write access to a slot may, if so requested or desired, be transferred from one node, typically having access to a surplus of time slots or serving less prioritised applications, to another node that for some reason is in need of transfer capacity.

In an example of such a system, wherein a feature of write access to slots is accompanied by a feature of slot ownership, a first node that owns a slot may, if so desired or required, temporarily lend the actual write access to that slot to a second node that for some reason requires more capacity. In such a case, the second node borrowing the slot will temporarily have the write access to the slot, but will typically be obliged to, at some point in time, return the write access to the slot to the owner of the slot, i.e. to the first node, for example as soon as the second node stops using.

As an example of such a system, WO9736402 discloses a method in a communication network of the afore-mentioned kind, in which the degree of temporary allocation of slots is evaluated, and in which, responsive to the evaluation of temporary allocation, the number of slots being owned by nodes is modified accordingly. That is, the ownership of a slot is transferred from one node to another based on the degree of borrowing of slots.

A problem in these kind of networks is to ensure that the distribution of access to slots is conflict free, i.e. that at no time no two or more nodes on a link regards themselves as having write access to, and thereby risk writing data into, the same slot position. One way of addressing this problem has been to add acknowledgement features in relation to every change in the write access distribution. As an example thereof, when access to a slot is transferred from one node to another, this transfer must be acknowledged by both nodes, and in some systems even by other nodes as well.

This feature of acknowledgement has the advantage of limiting the risk of creating access conflicts, but also provides the negative effects of increasing signalling overhead in the network, increasing the number of states that each node must be aware of, thereby increasing the complexity of the design of the nodes, as well as slowing down operation.

SUMMARY OF THE INVENTION

It is an object of the invention to provide a solution to the above mentioned and other problems, and to provide a scheme that simplifies the way in which a conflict free distribution of access to resources in the network is ensured.

This object is achieved by the invention as set forth in the accompanying claims.

The invention is based upon the idea that a conflict free distribution can be ensured if each node always considers its access to a slot as uncertain in all situations where there is any uncertainty what so ever as to whether or not any other node may consider itself as having the access to the slot, and that the node thus does not put the slot into actual use in such situation.

In this context, putting a slot into actual use may include, but is not limited to, actually transmitting data in it, allocating it to a channel, or any similar type of action that would imply that data may or will be written into the slot.

To sort out the uncertainty, the node will, according to the invention, use what is referred to herein as a so-called probe-message to inquire the access status with respect to such a slot. If the replies to this probe-message indicates that no other node on the link considers itself as having said access to the subject slot, is using the slot, is the owner of the slot and/or the like, the inquiring node may conclude that it is now free to consider itself as having the access to the slot.

As an example, assume that node A owns a slot and lends it to node B. If B does not return the slot within a certain period of time, this may be because of many different reasons. For example, node B might not have understood that the slot was put to its disposal in the first place, node B might have suffered a failure and is unable to communicate, node B might have tried to return the slot to node A but the information pertaining thereto has failed to reach node A, or node B might still be using the slot and has consequently not yet returned the write access thereto. To clarify this situation of uncertainty, according to an embodiment of the invention, node A will simply send a probe-message, at least to node B. If there is no reply to this probe message from node B, the write access status with respect to the slot is still uncertain and node A will therefore continue regarding the slot as lent to another node. If there is a reply from node B stating that it uses the slot, the situation is clarified and node A will continue regarding the slot as lent to another node. However, if there is a reply from node B stating that it does not claim any access to the slot, node A is allowed to regard itself as having the access to the slot knowing that this will not cause any access conflict.

According to a preferred embodiment of the invention, such a probe-message is sent to address all nodes connected to the same link to ensure that no node on the link considers itself as having said access to the slot. An advantage with this embodiment is for example that a node does not have to remember which other node that a slot was lent to, as it simply sends the probe-message to all nodes. Another advantage with this embodiment is that it is ensured that no other node has started to believe itself to have write access to the slot by mistake.

In an alternative embodiment, such a probe-message is only sent to node(s) in relation to which an access conflict is determined likely, which for example will be the node to which write access to the slot was lent. An advantage with this embodiment is that it reduces the amount of probe-messages and replies distributed on the link.

Moreover, as will be understood by those skilled in the art, many different policies for when to send a probe-message, whom to send it to, what specific information to ask for, which kind of replies to expect, and how to act thereupon, all pertaining to the access status of one or more time slots, may be implemented within the scope of the invention.

The invention may advantageously substitute the use of acknowledgement messages in the context of changes in the distribution of access to resources. As more than 99 percent of all messages pertaining to changes in the access distribution are normally received correctly in a typical network system, this means that use of the invention decreases the amount of signalling in more than 99 percent of the cases, and increases the amount of signalling in less than one percent of the cases.

Preferably, a resource for which access thereto is investigated using a probing feature according to the invention, will refer to an exclusive write access to of a time slot positions within each recurring frame on a unidirectional link, optionally as limited to a portion of the link, thereby making it possible for two or more nodes to use the time slot on separate portions of the link.

In a system wherein a node that owns a slot may temporarily lend the actual write access to that slot to another node, a probe-message according to the invention may be advantageously used to investigate both, or either or, the ownership and the write access status with respect to one or more slots on the link.

These and other aspects, features and advantages of the invention will be more fully understood from the following description of exemplifying embodiments thereof.

BRIEF DESCRIPTION OF THE DRAWINGS

Exemplifying embodiments of the invention will now be described with reference to the accompanying drawings, in which:

FIG. 1b illustrates an exemplary frame structure used in the network of FIG. 1a;

DETAILED DESCRIPTION OF PREFERRED EMBODIMENTS

Figure 1A:
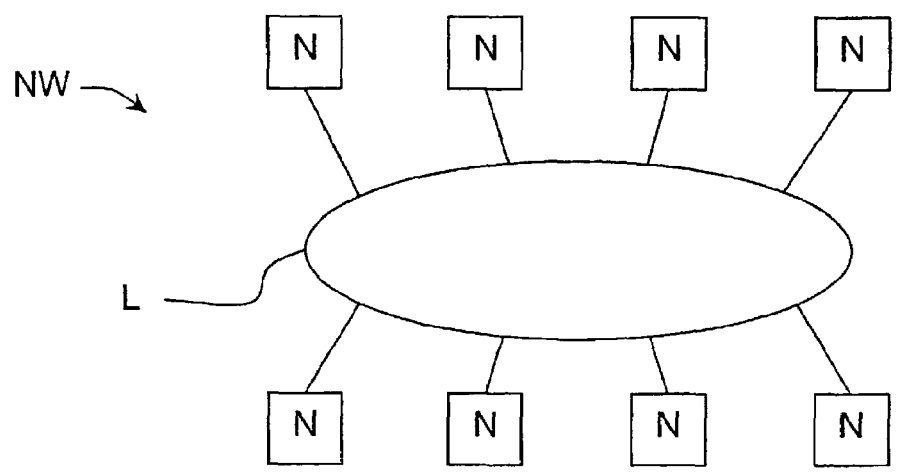
FIG. 1a illustrates an exemplary network of the kind addressed by the invention.
Figure 1B:
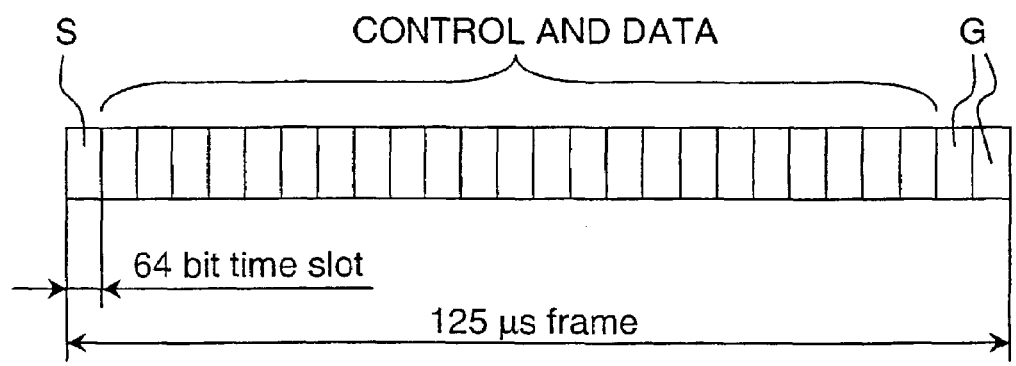

An exemplary communication network NW of the kind addressed by the invention is shown in FIG. 1a and comprises a plurality of nodes N that are interconnected via a single-ring link L. One the link L, a recurrent, essentially fixed size frame of the kind illustrated in FIG. 1b is transported uni-directionally. In the exemplified network, each frame has a nominal duration of 125 μs and is divided into a plurality of 64-bit time slots. The start of each frame is identified by a so-called synchronisation slot S, and the end of each frame is provided with so-called guard band slots G included to accommodate for small jitters in the network frame frequency. The remaining slots of the frame are control and data slots used for transporting control signalling and payload data, respectively, between the nodes N on the link L.

Write access to the control and data slots are distributed, and may at any time be re-distributed as desired, among the nodes N connected to the link L.

In the following figures, it is assumed that changes in the distribution of write access to slots as well as ownership of time slots is handled by control messages sent and received by the nodes of the network, and that said messages include Resource Transfer (RES_TR) messages, Ownership Change (OWN_CH) messages, Probe (PR) messages, and Probe Reply (PR_REP) messages, said massages having the following characteristics:

A Resource Transfer (RES_TR) is used when a node transfers the write access to a slot to another node. It is a unicasted message that is sent from the former node to the latter node and identifies the slot (or slots) for which write access is transferred.

An Ownership Change (OWN_CH) message is used by a master node on the link (for example being appointed as the node having the lowest link layer address) to inform the nodes connected to the link on changes in the distribution of slot ownership. It is a broadcasted message that is sent from the master node to all nodes on the same link and identifies which node that is the owner of which slots. (Note that the owner of a slot need not in this example necessarily have the write access to the slot, as the write access to the slot may have been borrowed by another node).

A Probe (PR) message is used when a node wants to investigate the write access situation with respect to a specific time slot. It is a broadcasted message that is sent from the investigating node to all other nodes on the same link and identifies the slot (or slots) that the inquiry pertains to.

A Probe Reply (PR_REP) message is used by each node as the reply to a received Probe message. It is a unicasted message that shall be sent, from each node that has received a Probe Message, to the node that was the sender of that Probe Message. It identifies whether or not the node sending the Probe Reply message considers itself as having write access to the slot (or slots) that the Probe Message pertained to.

Message procedures incorporating probe-message features according to embodiments of the invention will now be described with reference to the signalling diagrams of FIGS. 2 and 3. For simplicity, it is assumed in FIGS. 2 and 3 that the link of interest is only accessed by three nodes A, B and C, and that node C has been appointed master node on this link, which in these examples means that node C controls the distribution of slot ownership on the link. Also, note that time flow from top to bottom in FIGS. 2 and 3.

Figure 2:
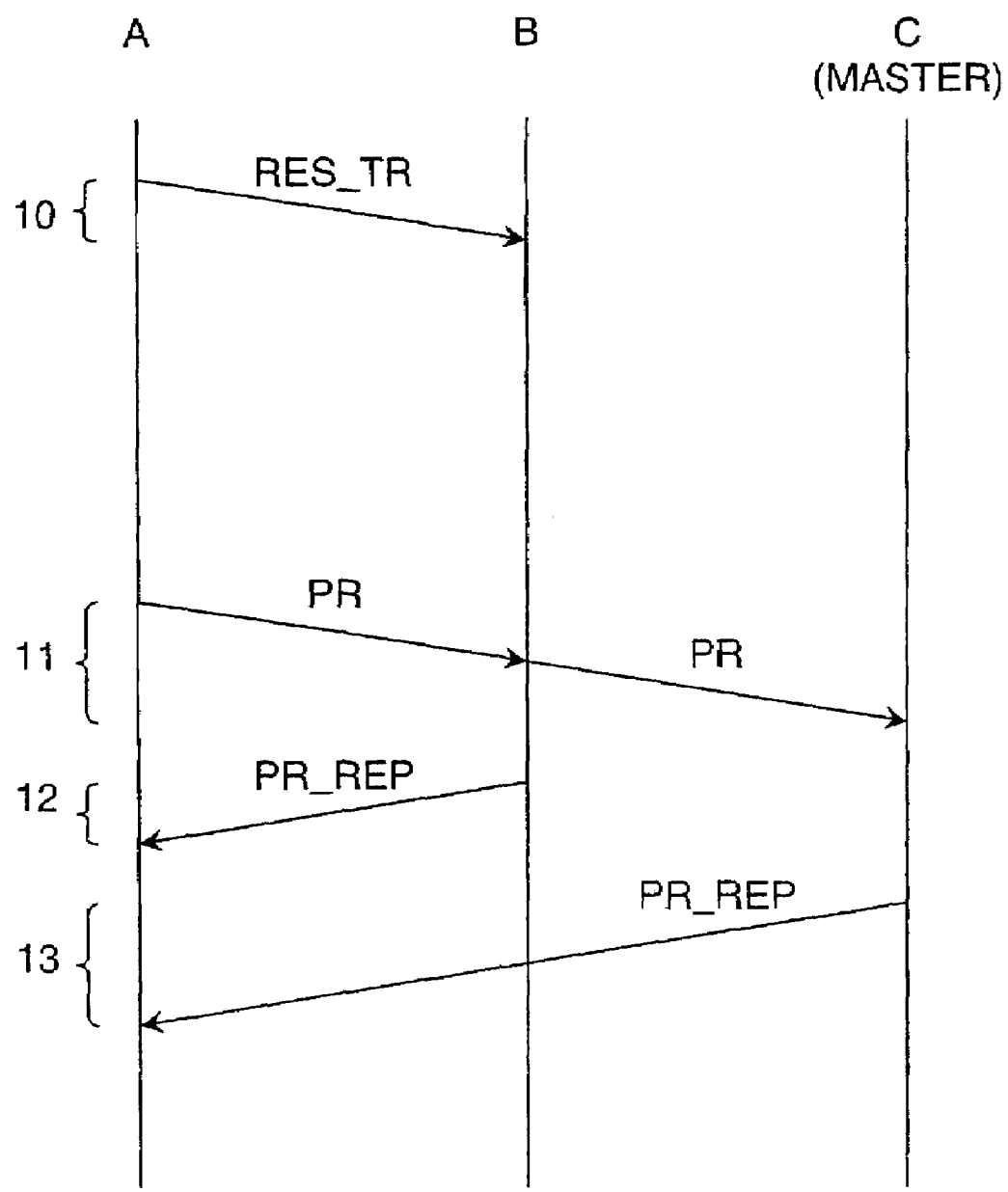
FIGS. 2 and 3 are schematic signalling diagrams illustrating probe-message incorporating processes according to embodiments of the invention.

In FIG. 2, as a result of node B having announced a need for write access to more slots (typically including one or more messages not illustrated in FIG. 2), node A transfers write access to a set of the slots that it is the owner of to node B by sending a Resource Transfer (RES_TR) message 10 to node B. Note that node B in this embodiment does not send any acknowledgement on this transfer to node A.

At repeated intervals, node A will instead "probe" all slots that it is the owner of and that it has lent to other nodes to make sure that they are actually in use by the other nodes and not have been "lost" in the system. Consequently, after a certain time, node A will send a Probe (PR) message 11 pertaining to the set of slots borrowed by node B to all nodes on the link. In reply to the Probe message 11, node B and C will send Probe Reply (PR_REP) messages 12 and 13, respectively, to node A. If both Probe Reply messages 12 and 13 are received by node A and indicate that neither node B nor node C consider itself as having write access to the subject set of slots (meaning that the write access to the slots in fact were "lost" in the system), node A is allowed to determine that it has the write access to the set of slots and that the set of slots shall no longer be considered lent to another node. However, in all other situations, i.e. if any one of node B or node C fails to reply to the probe message, if the reply from any one of the nodes B or C fails to reach node A, or if any one of the replies received by node A indicates that any one of node B or node C considers itself as having write access to the set of slots, node A will continue to consider the set of slots as still being lent to another node.

Consequently, according to this embodiment node A will stop the repeated probing the subject set of slots as a result of node B returning the set of slots to node A, node C (being the master node) deciding upon a new distribution of slot ownership that no longer makes node A the owner of the set of slots and thus no longer makes node A the "lender" that is obliged to probe the set of slots, or as a result of a probe message exchange causing node A to determine that no other node on the link has the write access to the subject set of slots.

Figure 3:
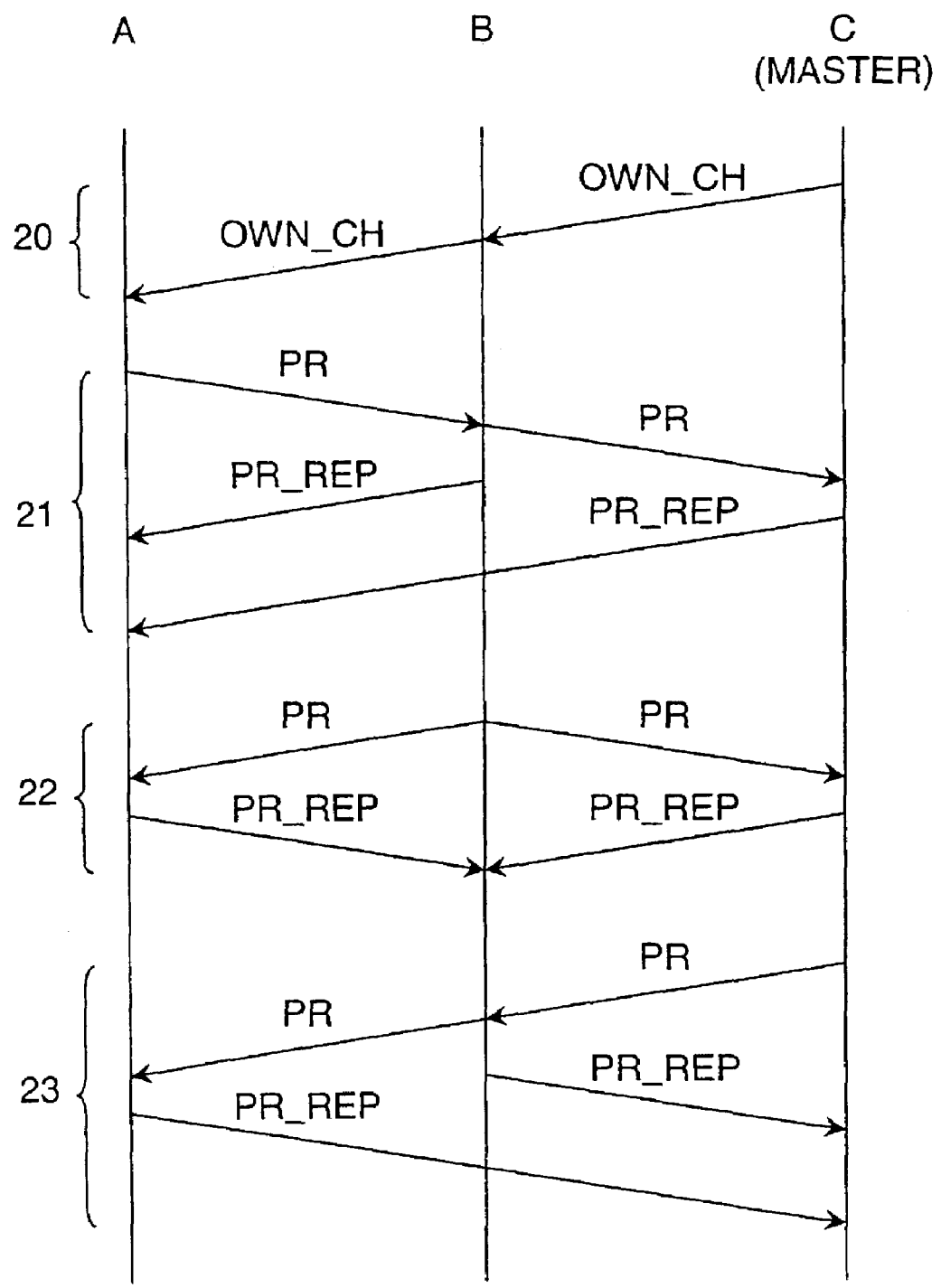

FIG. 3 shows a process for distributing ownership of slots to the nodes according to another embodiment of the invention. In the exemplified procedure, the master node informs all nodes on the link on which nodes that are the owner of which slots using an Ownership Change (OWN_CH) message 20 that is broadcasted to all nodes. However, to make sure that no node has misinterpreted the ownership change, perhaps by not having received the Ownership Change message 20, in a way that may risk two or more nodes regarding themselves as both having write access to the same slot, a node will not immediately start using a new slot that it has been given ownership of or access to according to the ownership change message, but will at first regard the so-received slot as being lent, or at least as having an uncertain write access status. The node will therefore send a probe message to make sure that no other node on the link regards itself as having write access to the slot or as being the owner of the slot, in similar to what has been described above with reference to FIG. 2. Only after having verified so will the node conclude that it may consider itself as having write access to the slot and may therefore start to use the slot for transmission (or for example lend it to another node).

This is illustrated in FIG. 3 at 21, wherein node A sends a Probe (PR) message to nodes B and C, which respond by sending Probe Reply (PR_REP) messages back to node A. Similarly, as illustrated in FIG. 3 as probing session 22, node B verifies that the access to the new slots that it has been given ownership of according to the Ownership Change message 20 is conflict free by sending a similar Probe (PR) message to node A and C and receiving similar replies from node A and C. At 23, a similar probing session is initiated by node C for node C to verify the conflict free access to the slots that it has been given ownership of by the Ownership Change message 20.

It shall be understood that the probing sessions 21, 22 and 23 with respect to node A, B and C, respectively, have been illustrated as taking place after each other in FIG. 3 to simplify description, and that they may, and normally will, be performed more or less at the same time and will thus overlap each other in time.

The above described process is advantageously be used for verifying a conflict free write access situation in the context of any ownership change, i.e. during ongoing operation as well as the change represented by a link startup/restart.

Figure 4A:
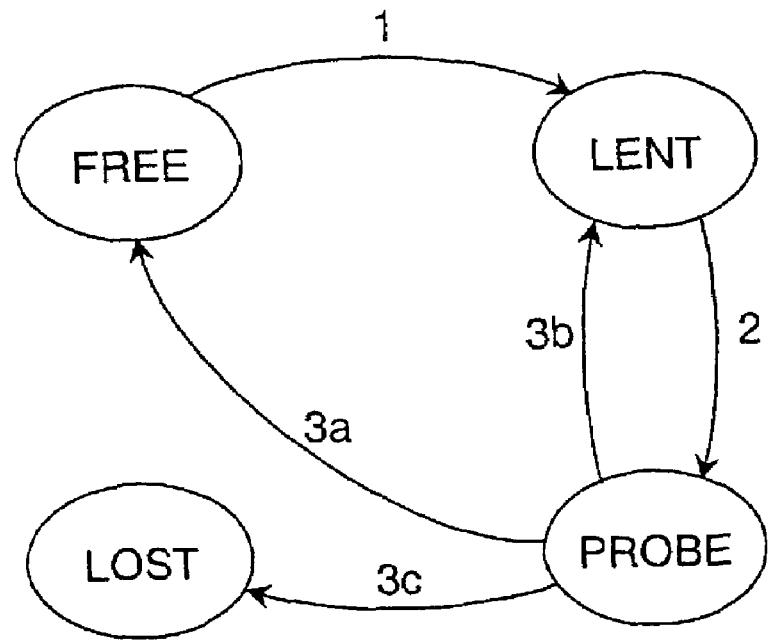
FIGS. 4a and 4b show state transitions according to embodiments of the invention.
Figure 4B:
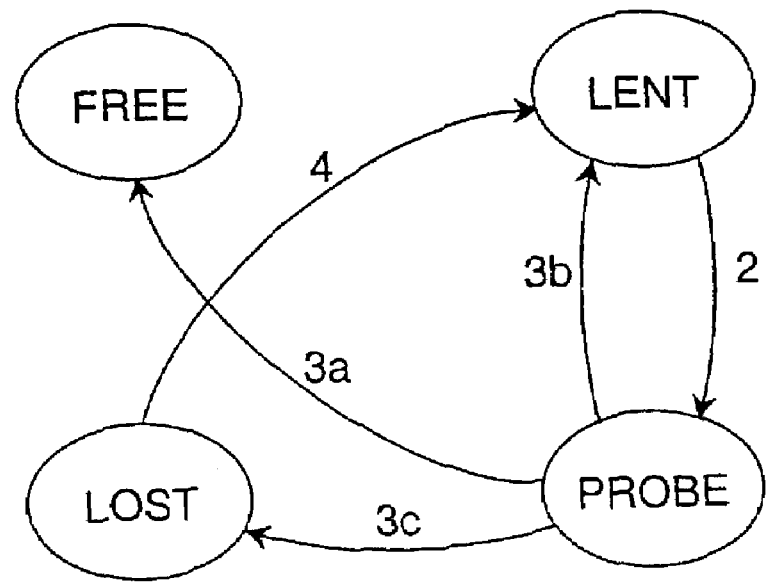

To further exemplify embodiments of the invention, FIGS. 4*a* and 4*b* illustrate exemplifying transitions between states at node A in accordance with the procedures that have been described in FIGS. 2 and 3, respectively. In these figures, each slot is by node A considered to be in one of several states including, however not being limited to, the following states:

FREE, wherein the slot is owned by node A and is available for immediate use by node A;

LENT, wherein the slot is owned by node A, but write access thereto is temporarily lent to another node;

PROBE, wherein node A has initiated a probing procedure with respect to the slot; and LOST, wherein the slot is neither owned nor used by node A.

In FIG. 4*a*, it is initially assumed that node A owns the slot and that it considers the slot to be in the FREE state. As a result of node B being in need of more transfer capacity, the node A lends the slot to node B, cf. FIG. 2, whereby the state of the slot goes to the LENT state (transition 1) as far as node A is concerned. As mentioned above, node A will in this embodiment repeatedly probe all slots that is has in the LENT state to make sure that they are actually in use by other nodes and has not been "lost" in the system. Hence, after a period of time, node A will start a probing session with respect to the subject slot and will during the probing session regard the slot as being in the PROBE state (transition 2). If outcome of the probing session is that no other node on the link claims any access to the slot, node A will consider the slot as once again being in the FREE state (transition 3*a*). However, in all other cases, e.g. if the slot is in use by another node or if there is any uncertainty as to the access status of the slot, node A will for now continue to regard the node as being in the LENT state (transition 3*b*). Also, to exemplify a third possible transition from the PROBE state, if node A receives an ownership change message that indicates that the slot, while being in the PROBE state, is no longer owned by node A, node A will consider the slot as being LOST (transition 3*c*).

In FIG. 4*b*, it is initially assumed that node a is not an owner, nor a user of the slot, and the slot is thus as far as node A is concerned regarded as being in the LOST state. It is then assumed that node A receives an ownership change message that indicates that the subject slot is now to be owned by node A, cf. FIG. 3. For reasons similar to what has been described with reference to FIG. 3, node will then at first regard the slot as being in the LENT state (transition 4). It will then start a probing session (transition 2) to verify the write access status with respect to the slot, said probing session having the same possible outcomes (transitions 3*a*, 3*b* and 3*c*) as has been described above with reference to FIG. 4*a*.

Although the invention has been exemplified above using embodiments wherein the probing feature according to the invention is used primarily for making sure that write access to a slot has not been "lost" in the system, the invention may of course just as well to make sure that nothing has caused two nodes to consider themselves as both being the owner of or having write access to the same slot. For example, a node could use the invention to verify the conflict free status of all time slots that it considers as being FREE, i.e. that is meant to be available for immediate use by the node.

Moreover, even though the invention has been exemplified above using embodiments wherein the probing feature according to the invention is used primarily for verifying or monitoring a conflict free write access situation, and/or a conflict free slot ownership distribution, both being preferred uses, it may just as well be used to verify any other type of slot/token access status.

Also, even though the invention has been described using embodiment wherein the probing feature of the invention is used with respect to access to one or more time slots, it may advantageously be used to in systems wherein access to a slot or set of slots may be limited to a portion of a link, thereby making it possible for two or more nodes to use the time slot on separate portions of the link. The inquiries and replies related to a probing session according to the invention would then preferably include optional information on which portion of a link over which a node considers itself to have write access to the subject slot (or slots).

As is understood, many different alterations and modifications with respect to embodiments described above, as realised by those skilled in the art, may be made within the scope of the invention, which is defined by the accompanying claims.

The invention claimed is:

1. A method for controlling resources on a communication link that transports data in time slots, wherein access to said time slots is distributed among nodes connected to said link, said method comprising:
    verifying a state of access to a set of one or more of said time slots by sending an inquiry to one or more of said nodes and receiving one or more replies to said inquiry from said one or more nodes, said inquiry and replies being related to whether or not any one of said one or more nodes considers itself as currently having access to any one or more of said set of time slots,
    wherein said verifying step is performed repeatedly with respect to those time slots, of time slots that said node is the owner of, that said node currently considers itself as not having said access to.

2. A method as claimed in claim 1, comprising the step of using information provided by said replies to determine whether or not to re-define the state of said access.

3. A method as claimed in claim 1 or 2, wherein a time slot is defined as a time slot position within a recurrent frame on said link.

4. A method as claimed in claim 1 or 2, wherein said access refers to an exclusive write access to any one or more of a set of time slots.

5. A method as claimed in claim 1 or 2, wherein said access refers to ownership of any one or more of said set of time slot.

6. A method as claimed in claim 5, wherein said inquiry refers to whether or not any node being addressed by said inquiry considers itself to be the owner of any one or more of said set of time slots as well as whether or not it considers itself to have exclusive write access to any one or more of said set of time slots.

7. A method as claimed in claim 1 or 2, wherein said access furthermore refers to said access as optionally limited to a portion of said link.

8. A method as claimed in claim 1 or 2, wherein said inquiry is sent by one of the nodes connected to said link to one or more other nodes connected to said link, and wherein said replies are sent to said one of the nodes connected to said link.

9. A method as claimed in claim 8, wherein said one of the nodes determines itself as having said access if said replies indicate that no one of the nodes addressed by said inquiry considers itself as having said access.

10. A method as claimed in claim 8, wherein said one of the nodes will determine itself as not having said access if no reply to said inquiry is received from any one of said one or more other nodes.

11. A method as claimed in claim 8, wherein said one of the nodes will determine itself as not having said access if any one of said replies indicate that any one of the nodes addressed by said inquiry considers itself as having said access.

12. A method as claimed in claim 1 or 2, wherein said link is a uni-directional multi-access link.

13. A method for allocating access to time slots on a communication link among nodes connected to said link, said method comprising the steps of:
    determining that a node has received access to a set of one or more time slots; and
    said node refraining from using the time slots that it has so been given access to for transmitting data until having verified that these are not accessed by any other node on said link by sending an inquiry to one or more of said other nodes and receiving one or more replies to said inquiry from said one or more other nodes, said inquiry and replies being related to whether or not any one of said one or more nodes considers itself as currently having access to any one or more of said set of time slots,
    wherein said sending step and said receiving step are performed repeatedly with respect to those time slots, of time slots that said node is the owner of, that said node currently considers itself as not having said access to.

14. A method as claimed in claim 13, said steps including:
    determining that a node has received ownership of a time slot; and
    said node refraining from using said time slots for transmitting data until having verified that it is not accessed by any other node on said link by sending the inquiry addressing all other nodes on said link and receiving replies to said inquiry from said other nodes, said inquiry and replies other nodes considers itself as currently having access to said time slot.

* * * * *

UNITED STATES PATENT AND TRADEMARK OFFICE
CERTIFICATE OF CORRECTION

| | |
|---|---|
| PATENT NO. | : 7,305,002 B1 |
| APPLICATION NO. | : 10/129293 |
| DATED | : December 4, 2007 |
| INVENTOR(S) | : Johan Ageby et al. |

It is certified that error appears in the above-identified patent and that said Letters Patent is hereby corrected as shown below:

<u>In Claim 5, Column 7, Line 51</u>

"slot" should read --slots--

Signed and Sealed this

Twenty-ninth Day of April, 2008

JON W. DUDAS
*Director of the United States Patent and Trademark Office*